T. C. HENDRY.
Vehicle-Wheel.
No. 29,546.
Patented Aug. 7, 1860
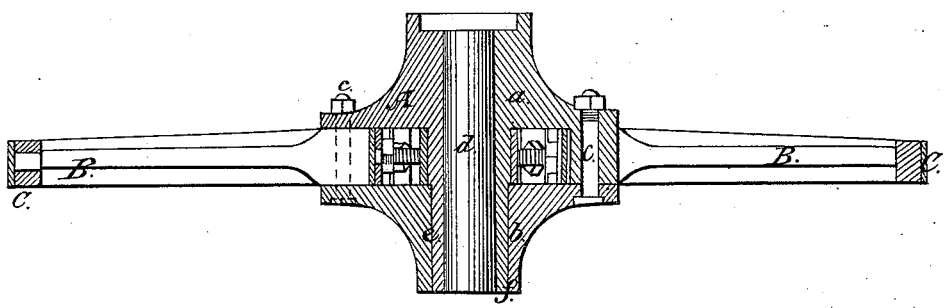
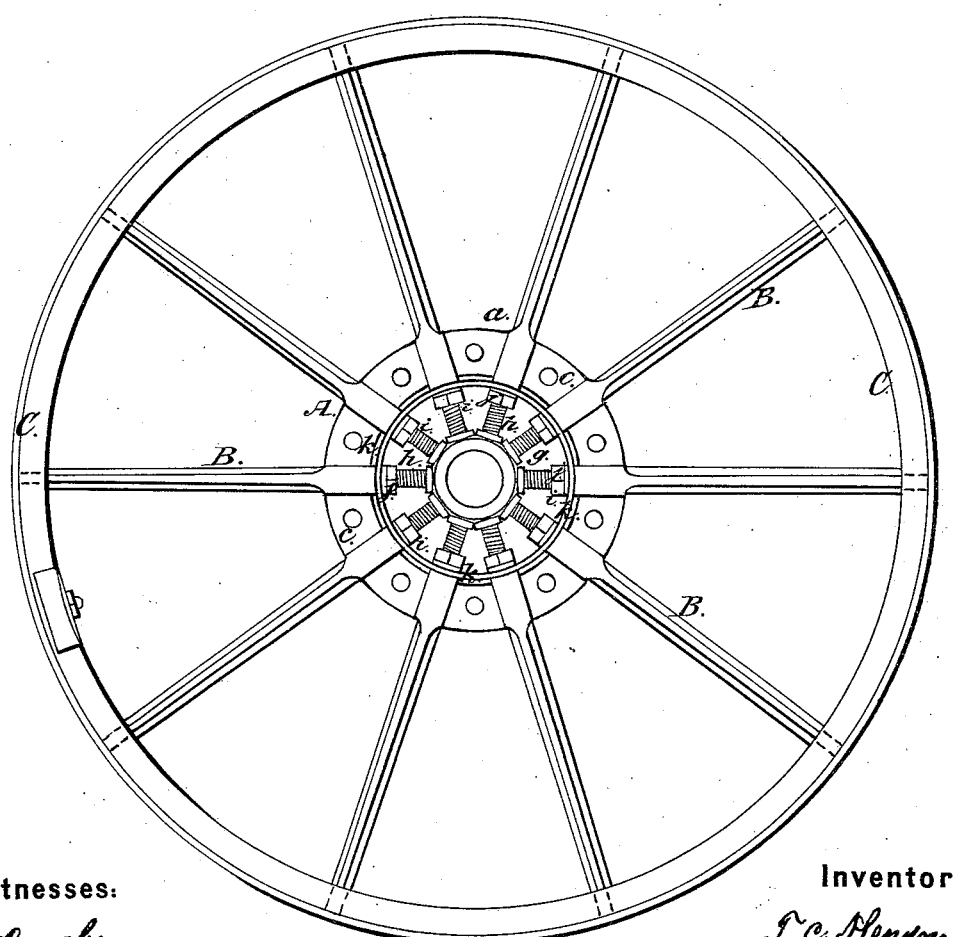
Witnesses:
Inventor:

UNITED STATES PATENT OFFICE.

T. C. HENDRY, OF CONYERS, GEORGIA, ASSIGNOR TO HIMSELF, J. DILLWORTH, S. H. DEAN, T. J. HUTSON, E. H. PATTERSON, AND A. J. HENDRY, OF SAME PLACE.

WHEEL FOR VEHICLES.

Specification of Letters Patent No. 29,546, dated August 7, 1860.

*To all whom it may concern:*

Be it known that I, T. C. HENDRY, of Conyers, in the county of Newton and State of Georgia, have invented a new and useful Improvement in Wheels for Vehicles; and I do hereby declare that the following is a full, clear, and exact description of the same, reference being had to the annexed drawings, making a part of this specification, in which—

Figure 1 is a central section of a wheel constructed according to my invention, the plane of section bisecting the axis of the hub longitudinally. Fig. 2 is a face view of the same with the outer part of the hub detached in order to show clearly the invention.

Similar letters of reference indicate corresponding parts in the two figures.

The object of this invention is to construct a wheel in such a manner that the spokes may be adjusted so as to admit of the expanding of the wheel and the consequent tightening of the tire when necessary; the invention also admitting of the removal of any of the spokes or fellies, so that they may be replaced by new ones when required.

The invention consists in constructing the hub of metal and of two parts, the interior of the hub being provided with screws and nuts, and the inner ends of the hubs bearing on the latter: all being arranged substantially as hereinafter fully shown and described whereby the desired end is attained.

To enable those skilled in the art to fully understand and construct my invention I will proceed to describe it.

A represents the hub of the wheel, which is of cast metal, and formed of two parts $a$, $b$, connected together by screw bolts $c$. The part $a$, of the hub has radial recesses in it to receive the inner ends of the spokes B, the portions of the spokes within the recesses being square conforming to the shape of the recesses. The inner parts of the spokes when fitted within the recesses are flush with the face of the part $a$, so that the part $b$, may fit snugly to the part $a$, as clearly shown in Fig. 1. The part $a$, has a hole $d$, through it to receive the arm of the axle, and said part $a$, is provided with a tubular projection $e$, concentric with the hole $d$, and projecting out from the face of $a$, a distance equal to the thickness of the part $b$, of the hub, as shown clearly in Fig. 1. The part $b$, of the hub has a central opening $f$, in it to receive the tubular projection $e$, of the part $a$.

In the face of the part $a$, of the hub there is an annular recess $g$, in which a series of screws $h$, are placed radially and in line with the spokes B, the inner ends of the screws having heads which bear against the inner side of the recess $g$.

On each screw $h$, there is placed a nut $i$, and a washer $j$, is placed at the outer side of each nut; the nuts being encompassed by a metal band $k$, against which the inner ends of the spokes bear—see more particularly Fig. 2. The outer ends of the spokes B, may be fitted in the fellies C, in the usual or in any proper way. The bolts $c$, pass through the two parts $a$, $b$, of the hub between the recesses which receive the inner ends of the spokes.

From the above description it will be seen that in order to expand the wheel and tighten the tire D, on the fellies C, all that is required to be done is to remove the part $b$, and screw out the nuts $i$. In order to remove a spoke or felly the nuts $i$, are screwed inward on the screws, so that the spokes may be detached from the fellies. Thus all shrinkage of the wheel may be compensated for, the spokes and fellies being of wood.

I do not claim broadly the constructing of a wheel hub of metal and of two parts connected together by screw bolts. But I do claim as new, and desire to secure by Letters Patent:—

The hub A, constructed of two parts $a$, $b$, the former having radial recesses to receive the inner ends of the spokes, in combination with the screws $h$, fitted in the annular recess $g$, of the part $a$, provided with nuts $i$, so arranged as to form the bearings of the inner ends of the spokes, as and for the purpose herein set forth.

T. C. HENDRY.

Witnesses:
T. L. RICHARDSON,
G. B. ALMAND, Jr.